May 4, 1954     M. T. PRESTIDGE ET AL     2,677,350
ANTPROOF ANIMAL FOOD TRAY
Filed Nov. 30, 1951     2 Sheets-Sheet 1
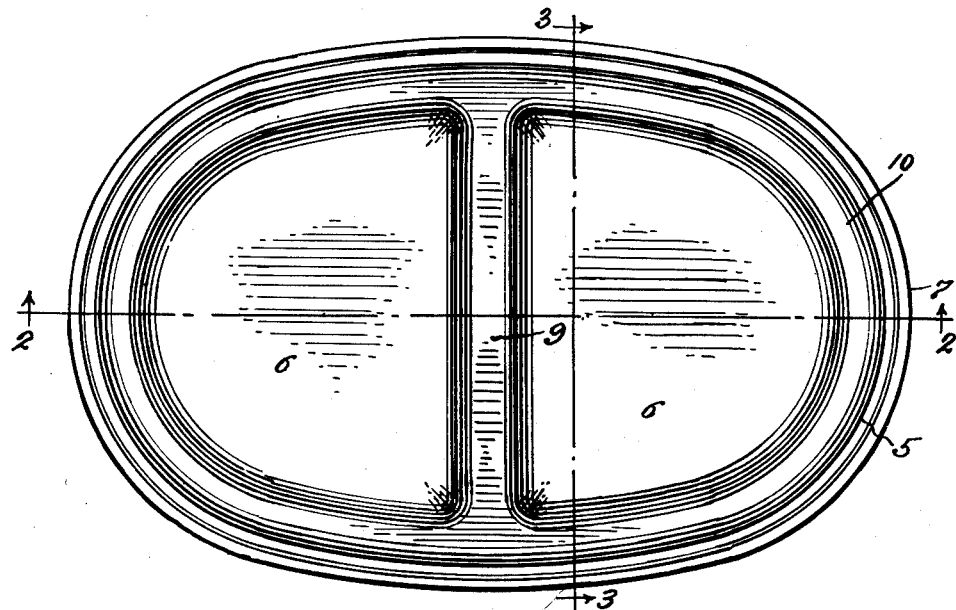
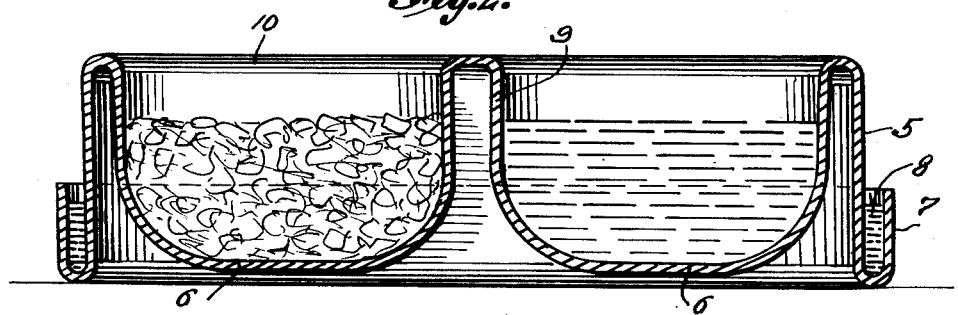
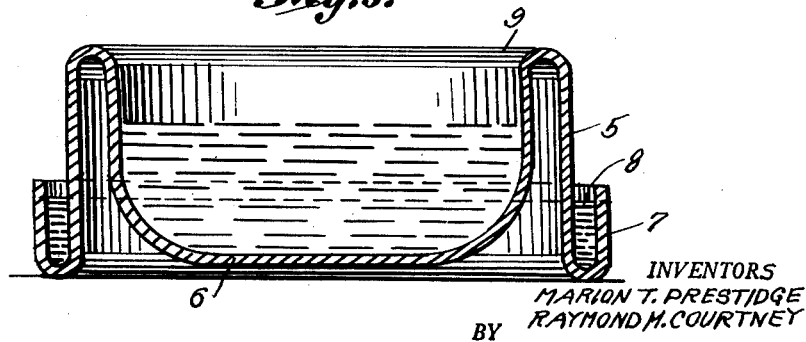
INVENTORS
MARION T. PRESTIDGE
RAYMOND M. COURTNEY
BY
Patrick D. Beavers
ATTORNEY May 4, 1954  M. T. PRESTIDGE ET AL  2,677,350
ANTPROOF ANIMAL FOOD TRAY
Filed Nov. 30, 1951  2 Sheets-Sheet 2
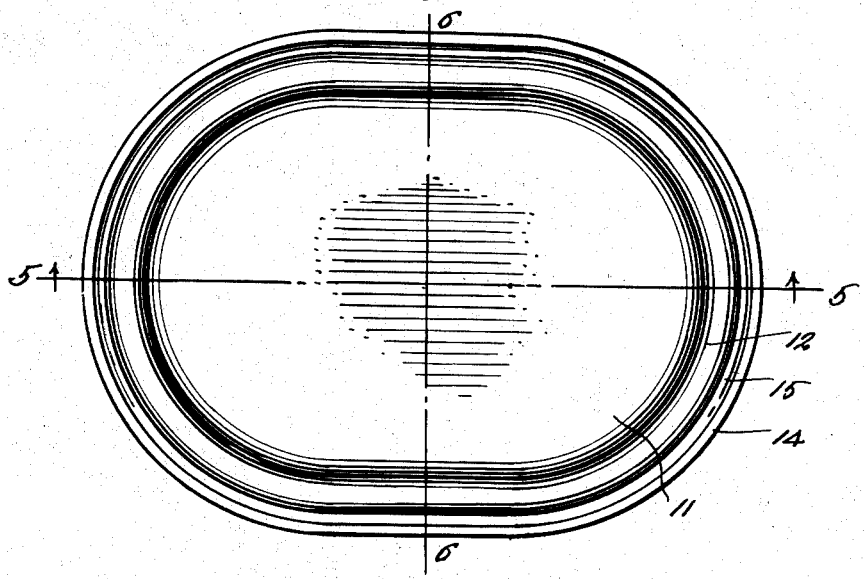
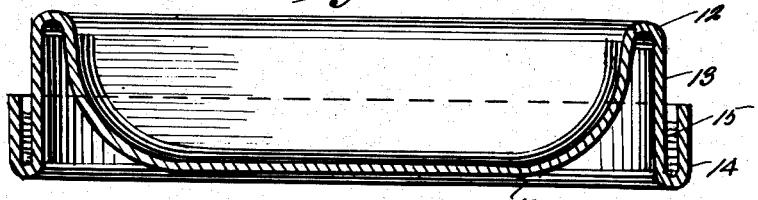
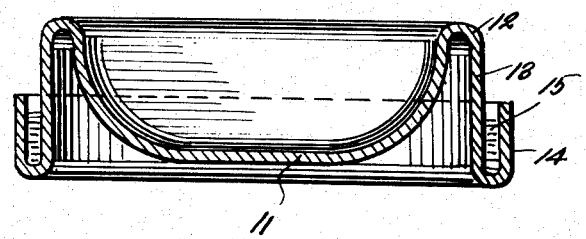
INVENTORS
MARION T. PRESTIDGE
BY RAYMOND M. COURTNEY
Patrick D. Beavers
ATTORNEY Patented May 4, 1954

2,677,350

UNITED STATES PATENT OFFICE 2,677,350

ANTPROOF ANIMAL FOOD TRAY

Marion T. Prestidge and Raymond M. Courtney, Galveston, Tex.

Application November 30, 1951, Serial No. 259,227

1 Claim. (Cl. 119—61)

This invention relates to improvements in feeding receptacles for animals such as dogs, cats, chinchillas and various other small animals.

The principal object of the present invention is to provide a food tray constructed in such a manner as to provide a small outstanding trough for the reception of an insecticide, whereby ants and other small insects are prevented from entering the food tray and causing the animals to develop a distaste for the food contained therein.

Another object of the invention is to provide a tray of this character which can be easily constructed and retailed at a low monetary figure.

These and various other objects and advantages of the invention will become apparent to the reader of the following description.

In the drawings:

Figure 1 is a top plan view of the double type tray.

Figure 2 is a section taken on line 2—2 of Figure 1.

Figure 3 is a cross-section taken on line 3—3 of Figure 1.

Figure 4 is a top plan view of the single tray structure.

Figure 5 is a cross-section taken on line 5—5 of Figure 4.

Figure 6 is a section taken on line 6—6 of Figure 4.

Referring to the drawings wherein like numerals designate like parts, it can be seen that the food tray shown in Figures 1, 2 and 3 is of the dual receptacle type, this consisting of a preferably stamped structure involving an ovate vertical side wall 5 with two food containing depressions 6 stamped, preferably from a single sheet of metal involving the side wall 5 and a very narrow circumferential trough 7. This trough 7 extends for about half of the vertical distance of the side wall 5 and is adapted to contain an insecticide 8. The trough is so narrow as to prevent an animal from contacting the insecticide but sufficiently wide to prevent an ant or other small insect from crossing without entering the insecticide.

The depressions 6, 6 are separated by a riser 9 which defines a partition between these depressions, to the end that one depression or receptacle can be used for food such as meat while the other may be used for water or milk.

It is preferable that the lower portions of the receptacles 6, 6 terminate above the bottom of the trough 7 so that the bottom of the trough will act as a rest for supporting the structure.

It will be observed that all edges of the depressions or receptacles 6, 6 as well as the partition 9 are rounded as at 10 and this rounded factor is carried out throughout the construction so that there are no hidden recesses or crevices in which dirt or other foreign matter can collect, to the end that the tray can be readily cleaned.

The tray can be constructed of any desired material, either metal or plastic.

A single receptacle form is shown in Figures 4, 5 and 6, this being composed of a single ovate shaped bowl 11 curved outwardly at its upper portion as at 12 and downwardly as at 13 to provide a side wall. The lower portion of this side wall is disposed upwardly as at 14 to define a trough containing insecticide 15. The bottom of the bowl 11 terminates somewhat above the bottom of the trough and it will be observed that all bent portions of the structure are rounded so that there are no hidden recesses or crevices for the collection of foreign matter, to the end that the tray can be quickly and thoroughly cleaned.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

An insect-proof animal feed tray comprising a bowl-like structure formed of any suitable material, a centrally disposed partition formed integrally with said structure, a dependent side wall integrally formed with the perimeter of said structure, and an outwardly extending trough formed integrally with the lower end of said side wall, said lower end of said side wall being in a lower horizontal plane than that in which lies the lower end of the bowl structure, and said trough being of much lesser height than said side wall.

References Cited in the file of this patent

UNITED STATES PATENTS

| Number | Name | Date |
|---|---|---|
| 576,196 | Johnson | Feb. 2, 1897 |
| 747,677 | Bierley | Dec. 22, 1903 |
| 1,351,285 | Chess | Aug. 31, 1920 |
| 1,990,049 | Perry | Feb. 5, 1935 |
| 2,191,811 | Trampier, Sr. | Feb. 27, 1940 |
| 2,554,086 | Block | May 22, 1951 |
| 2,584,301 | Sinclair | Feb. 5, 1952 |